Patented Aug. 13, 1929.

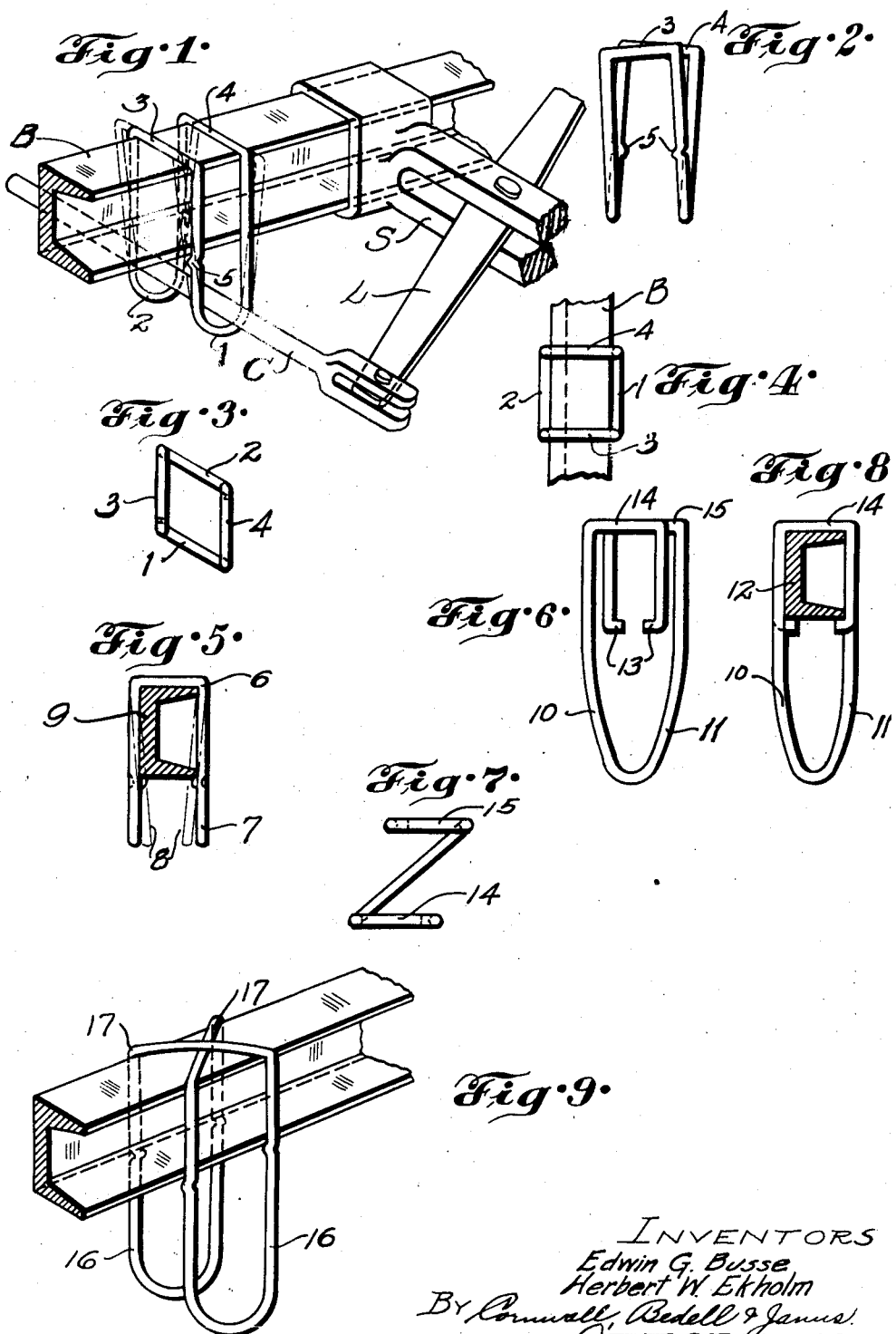

1,724,255

UNITED STATES PATENT OFFICE.

EDWIN G. BUSSE AND HERBERT W. EKHOLM, OF CHICAGO, ILLINOIS, ASSIGNORS TO CHICAGO RAILWAY EQUIPMENT COMPANY, OF CHICAGO, ILLINOIS, A CORPORATION OF ILLINOIS.

BRAKE-CONNECTING-ROD SAFETY GUARD.

Application filed May 14, 1927. Serial No. 191,415.

Our invention relates to railway rolling stock and consists in an improved safety guard for bottom connections of railway brake rigging.

Copending application filed by A. C. Moore, November 27, 1925, Serial No. 71,643, and application filed by H. W. Ekholm, November 27, 1925, Serial No. 71,655, illustrate various devices for the same general purpose.

The objects of the present invention are to more securely assemble the safety guard with its carrier and with the connection rod which it is adapted to support; to prevent rattling of the safety guard on its carrier, and to prevent movement of the safety guard along the carrier.

In the accompanying drawings which illustrate our invention—

Figure 1 shows a portion of a brake beam and its bottom connection with one form of our improved safety guard assembled therewith.

Figure 2 is a side elevation of the same safety guard showing the guard in its original position before it is applied to the brake beam.

Figure 3 is a top view of the same safety guard before it is applied to the brake beam.

Figure 4 is a top view of the same guard as applied to the brake beam.

Figure 5 illustrates a slight modification of the safety guard of the same general shape as the one illustrated in Figures 1 to 4 and showing the same applied to the brake beam.

Figure 6 is a side view of a modified form of safety guard showing the same before it is applied to the beam.

Figure 7 is a top view of the same.

Figure 8 is a view corresponding to Figure 6 but showing the guard applied to the brake beam.

Figure 9 illustrates another modification of our invention.

In all of the forms illustrated, the guard is shown as consisting of a one-piece rod having one or more U-shaped portions adapted to receive the lower bottom connection of the brake rigging and to support the latter in the event that the same is disconnected from its brake levers. Each form includes a plurality of inverted U-shaped sections adapted to receive and be supported by a carrier member. Each form includes a plurality of elements for engaging a downwardly facing surface on the brake beam to hold the guard in desired position.

In the form illustrated in Figures 1 to 4, the channel compression member of a brake beam is indicated at B and is provided with the usual brake beam strut S which mounts the inclined brake lever L, the lower end of which is pivotally connected to and supports one end of the bottom connection C. It will be understood that the opposite end of connection 4 is similarly carried by a corresponding brake lever similarly mounted on another brake beam.

The safety guard has two U-shaped portions for receiving the bottom connection, and the cross pieces 1 and 2 of these U-shaped portions, and the adjacent leg portions, lie in parallel planes and are spaced apart approximately the width of the flange of the brake beam member B. The upper part of the guard comprises two inverted U-shaped portions, the cross pieces 3 and 4 of which lie in substantially parallel planes extending transversely of the planes containing the lower portions of the guard. The depending legs on the inverted U-shaped portions merge with the legs of the U-shaped portions. Preferably the U-shaped portions extend diagonally across the space between the inverted U-shaped portions so that it is necessary to distort the device from the position shown in Figure 3 to the position shown in Figure 4 in order to provide sufficient space between all of the vertical elements to receive the brake beam channel.

When applied to the compression member of the brake beam which forms the carrier for the guard, the sides of the carrier will be engaged at a plurality of points spaced lengthwise of the carrier so that the guard is stably mounted on the carrier and will not rattle when the rolling stock is in motion.

While we show the device as closely engaging the sides of the carrier at four points, it will be understood that slight departures of the guard from the exact form intended, or irregularities in the sides of the carrier, may result in the engagement of the carrier by the guard at three points which will be sufficient to provide the stable engagement desired.

Two or more of the vertical elements of the guard are provided with projections 5 adapted to engage a downwardly facing surface on the carrier to prevent upward movement of the guard from the position indicated. This feature will prevent the guard working upwardly until it engages and binds the bottom connection, and will prevent the accidental removal of the guard from the brake beam when the bottom connection is disassembled for replacement or repairs.

When the bottom connection is assembled with the guard, the latter is positively locked against removal from the carrier and before the guard can be removed from the brake beam it is necessary to disassemble the bottom connection from the brake levers and withdraw the connection endwise through the guard.

In the modification illustrated in Figure 5, the inverted U-shaped portions 6 of the guard will originally extend at right angles to the U-shaped portions 7 but the latter will be inclined toward each other as indicated at 8 in dot-and-dash lines and must be forced apart when applied to the carrier 9.

In the modification illustrated in Figures 6, 7 and 8, we provide a single U-shaped portion for receiving the bottom connection, and each leg 10 and 11 of this U-shaped portion extends up one side of the carrier 12, and over the top of the same, and down the opposite side, and preferably terminates in an inturned lip 13 for engaging the bottom of the carrier. The two legs 10 and 11 are so disposed relatively to each other that their upper portions 14 and 15 are spaced longitudinally of the carrier and the vertical elements will engage the carrier at spaced points. With this form of our invention, there will be no need of welding or otherwise securing together ends of the blank from which the guard is formed.

In the modification illustrated in Figure 9, the U-shaped portions 16 which receive the bottom connection are substantially the same as those shown in Figures 1 to 4, but the inverted U-shaped portions 17 are disposed at right angles to each other and diagonally of the planes occupied by the U-shaped portions and portions 17 cross each other on top of the brake beam.

While we have illustrated our safety guard as applied to the compression member of a brake beam it will be understood that the guard may be supported upon another brake beam member or upon the spring plank of the truck, or upon another suitable truck part or attachment provided for the purpose of carrying the safety guard.

Obviously other modifications than those shown may be made in the details of our invention without departing from the spirit thereof, and we contemplate the exclusive use of the variations as fall within the scope of our claims.

We claim:

1. In a safety guard for a railway brake bottom connection, a portion for supporting the connection, three or more upright elements for engaging a carrier, said members being bodily displaced relatively to each other when said guard is mounted on its carrier.

2. In a safety guard for a railway brake bottom connection, a resilient member having elements for engaging the top, opposite sides, and bottom of a carrier at spaced points on each of the carrier sides.

3. In a safety guard for a car brake bottom connection, a resilient member having elements for engaging opposite sides of a carrier and engaging at least one of the carrier sides at points spaced longitudinally thereof.

4. A safety guard for a railway brake bottom connection comprising a pair of parallel inverted U-shaped loops adapted to embrace a carrier, said guard being formed of resilient material with said loops disaligned from each other before application to the carrier, and U-shaped loops connecting the lower ends of said inverted U-shaped loops and adapted to receive the bottom connection.

5. In railway brake rigging, a movable brake beam member, a brake lever, a bottom connection for said lever, and a safety guard for said connection comprising interconnected loops of resilient material sprung out of their original position and gripping opposite sides of said member at at least three points spaced longitudinally of said member.

6. In railway brake rigging, a brake beam member, and a bottom connection guard of resilient material yieldingly engaging said member at three or more points so as to be stably mounted on said member.

7. A brake beam bottom connecting safety guard comprising three or more elements adapted to yieldingly engage the sides of a carrier at points spaced longitudinally of the latter and including additional elements for engaging the top of the carrier and the bottom of the carrier.

8. A car brake connecting guard of inverted U-shape, each depending portion of which comprises an upright U-shape adapted to receive a bottom connection between its legs and includes integral projections for engaging the bottom of a carrier to prevent upward movement thereon.

9. In a safety guard for a railway brake bottom connection, a one-piece resilient rod comprising a pair of U-shaped portions, lying in substantially parallel planes and adapted to receive and support a bottom connection, and a pair of inverted U-shaped portions lying in substantially parallel plans normally extending diagonally of said first-mentioned planes, adapted to receive and be supported by a carrier, the legs of said inverted U-shaped portions merging with the legs of said U-shaped portions, whereby the device may be distorted to displace said portions to yieldingly grip the carrier.

10. In a safety guard for a railway brake bottom connection, a one-piece resilient rod comprising a pair of U-shaped portions, lying in substantially parallel planes and adapted to receive and support a bottom connection, a pair of inverted U-shaped portions lying in substantially parallel planes normally extending diagonally of said first-mentioned planes, adapted to receive and be supported by a carrier, the legs of said inverted U-shaped portions merging with the legs of said U-shaped portions, whereby the device may be distorted to displace said portions to yieldingly grip the carrier, and integral projections on diagonally opposite vertical elements of the device for engaging the bottom of the carrier to hold the device against displacement on the carrier.

11. In a safety guard for a railway brake bottom connection, a one-piece resilient element comprising a U-shaped portion adapted to receive and support a bottom connection, and a pair of inverted U-shaped portions adapted to be supported by and to yieldingly engage opposite surfaces of a carrier element on a railway truck, the legs of said inverted U-shaped portions merging with the legs of said U-shaped portion and one or more elements on said legs for engaging a downwardly facing surface on said carrier element to resist displacement of the guard on the carrier element.

In testimony whereof we hereunto affix our signatures this 11th day of May, 1927.

EDWIN G. BUSSE.
HERBERT W. EKHOLM.